US012798799B2

(12) United States Patent
Fuller et al.

(10) Patent No.: US 12,798,799 B2
(45) Date of Patent: Nov. 17, 2026

(54) SYSTEMS AND METHODS FOR NAVIGATION

(71) Applicant: University of Washington, Seattle, WA (US)

(72) Inventors: Sawyer B. Fuller, Seattle, WA (US); Zhitao Yu, Seattle, WA (US); Yash Pundalik Talwekar, Seattle, WA (US); Yogesh Madhavrao Chukewad, Seattle, WA (US); Vikram Subramaniam Iyer, Seattle, WA (US)

(73) Assignee: University of Washington, Seattle, WA (US)

( * ) Notice: Subject to any disclaimer, the term of this patent is extended or adjusted under 35 U.S.C. 154(b) by 56 days.

(21) Appl. No.: 18/868,532

(22) PCT Filed: May 24, 2023

(86) PCT No.: PCT/US2023/023416

§ 371 (c)(1),
(2) Date: Nov. 22, 2024

(87) PCT Pub. No.: WO2023/230169

PCT Pub. Date: Nov. 30, 2023

(65) Prior Publication Data

US 2026/0192949 A1 Jul. 9, 2026

Related U.S. Application Data

(60) Provisional application No. 63/374,416, filed on Sep. 2, 2022, provisional application No. 63/345,728, filed on May 25, 2022.

(51) Int. Cl.
*B64U 10/80* (2023.01)
*B64U 20/80* (2023.01)
(Continued)

(52) U.S. Cl.
CPC ............. *B64U 10/80* (2023.01); *B64U 20/80* (2023.01); *G01P 7/00* (2013.01); *G01S 17/08* (2013.01);
(Continued)

(58) Field of Classification Search
CPC ........... B64U 10/80; B64U 20/80; G01P 7/00; G01S 17/08; G06T 7/248; G06T 7/74
See application file for complete search history.

(56) References Cited

U.S. PATENT DOCUMENTS 9,387,927 B2 * 7/2016 Rischmuller .......... G05D 1/102
10,037,028 B2 7/2018 Loianno et al.
(Continued)

FOREIGN PATENT DOCUMENTS

JP 2005349517 12/2005
WO 2019/140699 7/2019

OTHER PUBLICATIONS

Chukewad et al., "Yaw Control of a Hovering Flapping-Wing Aerial Vehicle with a Passive Wing Hinge", IEEE Robotics and Automation Letters, 2021, pp. 1-8.
(Continued)

*Primary Examiner* — Tyler J Lee
(74) *Attorney, Agent, or Firm* — McDonnell Boehnen Hulbert & Berghoff LLP

(57) ABSTRACT

A method includes detecting an acceleration of an object with an accelerometer, capturing a first image of an environment of the object at a first time and a second image of the environment at a second time that is after the first time, determining a state of the object based on the acceleration and one or more of the first image or the second image, the state including one or more components that include an
(Continued)

orientation, an angular velocity, a position, or a translational velocity of the object, and performing an action based on the state of the object.

20 Claims, 9 Drawing Sheets

(51) Int. Cl.

| | |
|---|---|
| ***G01P 7/00*** | (2006.01) |
| ***G01S 17/08*** | (2006.01) |
| ***G06T 7/246*** | (2017.01) |
| ***G06T 7/73*** | (2017.01) |
| *B64U 101/30* | (2023.01) |

(52) U.S. Cl.

CPC ................ *G06T 7/248* (2017.01); *G06T 7/74* (2017.01); *B64U 2101/30* (2023.01); *B64U 2201/10* (2023.01); *G06T 2207/10032* (2013.01)

(56) References Cited

U.S. PATENT DOCUMENTS

| | | | | |
|---|---|---|---|---|
| 10,648,809 | B2 * | 5/2020 | Diem | G05D 1/0094 |
| 10,928,832 | B2 * | 2/2021 | Yadmellat | B60W 60/001 |
| 11,514,597 | B1 * | 11/2022 | Shen | G05D 1/0094 |
| 2011/0029161 | A1 | 2/2011 | Zufferey et al. | |
| 2015/0149000 | A1 * | 5/2015 | Rischmuller | G05D 1/102 701/7 |
| 2017/0212529 | A1 | 7/2017 | Kumar et al. | |
| 2018/0158200 | A1 * | 6/2018 | Metzler | G01C 15/00 |
| 2019/0094023 | A1 * | 3/2019 | Diem | G01C 17/38 |
| 2019/0101930 | A1 * | 4/2019 | Yadmellat | B60W 60/001 |
| 2019/0329772 | A1 * | 10/2019 | Graves | B60W 30/16 |
| 2020/0020093 | A1 * | 1/2020 | Frei | G06T 7/74 |
| 2020/0066034 | A1 * | 2/2020 | Tham | G01C 15/00 |
| 2021/0061278 | A1 * | 3/2021 | Zhao | G01C 21/3492 |
| 2021/0070439 | A1 | 3/2021 | Fuller et al. | |
| 2024/0199204 | A1 * | 6/2024 | Pearson | G05D 1/622 |

OTHER PUBLICATIONS

International Search Report (ISR) with Written Opinion issued in Int'l Application No. PCT/US2023/023416, mailed Nov. 6, 2023, 10 pages.

Talwekar, Yash P. et al. "Towards Sensor Autonomy in Sub-Gram Flying Insect Robots: A Lightweight and Power-Efficient Avionics System" International Conference on Robotics and Automation (ICRA) (2022), pp. 9675-9681; Https://doi.org/10.1109/ICRA46639.2022.9811918.

* cited by examiner

SYSTEMS AND METHODS FOR NAVIGATION

CROSS-REFERENCE TO RELATED APPLICATIONS

This application is a § 371 national stage of international application no. PCT/US2023/023416, filed on May 24, 2023, which claims priority to U.S. Provisional Patent Application No. 63/374,416, filed on Sep. 2, 2022, and U.S. Provisional Patent Application No. 63/345,728, filed on May 25, 2022, the entire contents of all of which are incorporated by reference herein.

STATEMENT REGARDING FEDERALLY SPONSORED RESEARCH OR DEVELOPMENT

This invention was made with government support under Grant No. 2054850, awarded by the National Science Foundation (NSF). The government has certain rights in the invention

BACKGROUND

Because of their small size, flying insect-sized robots (e.g., weighing less than a gram) have the potential to outperform larger robots at tasks such as search and rescue operations, gas leak detection, and environment monitoring. Their potential advantages include low production cost, which would allow deployment in greater numbers. Their small size also enables navigation in confined spaces and around humans without impact hazard. Despite these potential advantages, the design of such robots includes the challenges of miniaturizing actuators, mechanical and power systems, and sensing and control systems.

SUMMARY

A first example is a method comprising detecting an acceleration of an object with an accelerometer; capturing a first image of an environment of the object at a first time and a second image of the environment at a second time that is after the first time; determining a state of the object based on the acceleration and one or more of the first image or the second image, the state comprising one or more components that include an orientation, an angular velocity, a position, or a translational velocity of the object; and performing an action based on the state of the object.

A second example is a non-transitory computer readable medium storing instructions that, when executed by a computing device, cause the computing device to cause performance of the method of the first example.

A third example is an aerial vehicle comprising: an accelerometer; a camera; an actuator; one or more processors; and a computer readable medium storing instructions that, when executed by the one or more processors, cause the aerial vehicle to perform the method of the first example.

A fourth example is a wearable device comprising: an accelerometer; a camera; a gyroscope; a rangefinder; one or more processors; and a computer readable medium storing instructions that, when executed by the one or more processors, cause the wearable device to perform the method of the first example.

The following publications are hereby incorporated by reference: Y. P. Talwekar, A. Adie, V. Iyer and S. B. Fuller, "Towards Sensor Autonomy in Sub-Gram Flying Insect Robots: A Lightweight and Power-Efficient Avionics System," 2022 International Conference on Robotics and Automation (ICRA), Philadelphia, PA, USA, 2022, pp. 9675-9681, doi: 10.1109/ICRA46639.2022.9811918; Sawyer Fuller, Zhitao Yu, Yash P. Talwekar, A gyroscope-free visual-inertial flight control and wind sensing system for 10-mg robots. Sci. Robot. 7, eabq8184 (2022). DOI: 10.1126/scirobotics. abq8184.

When the term "substantially" or "about" is used herein, it is meant that the recited characteristic, parameter, or value need not be achieved exactly, but that deviations or variations, including, for example, tolerances, measurement error, measurement accuracy limitations, and other factors known to those of skill in the art may occur in amounts that do not preclude the effect the characteristic was intended to provide. In some examples disclosed herein, "substantially" or "about" means within +/−0-5% of the recited value.

These, as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible.

DETAILED DESCRIPTION

Figure 1:
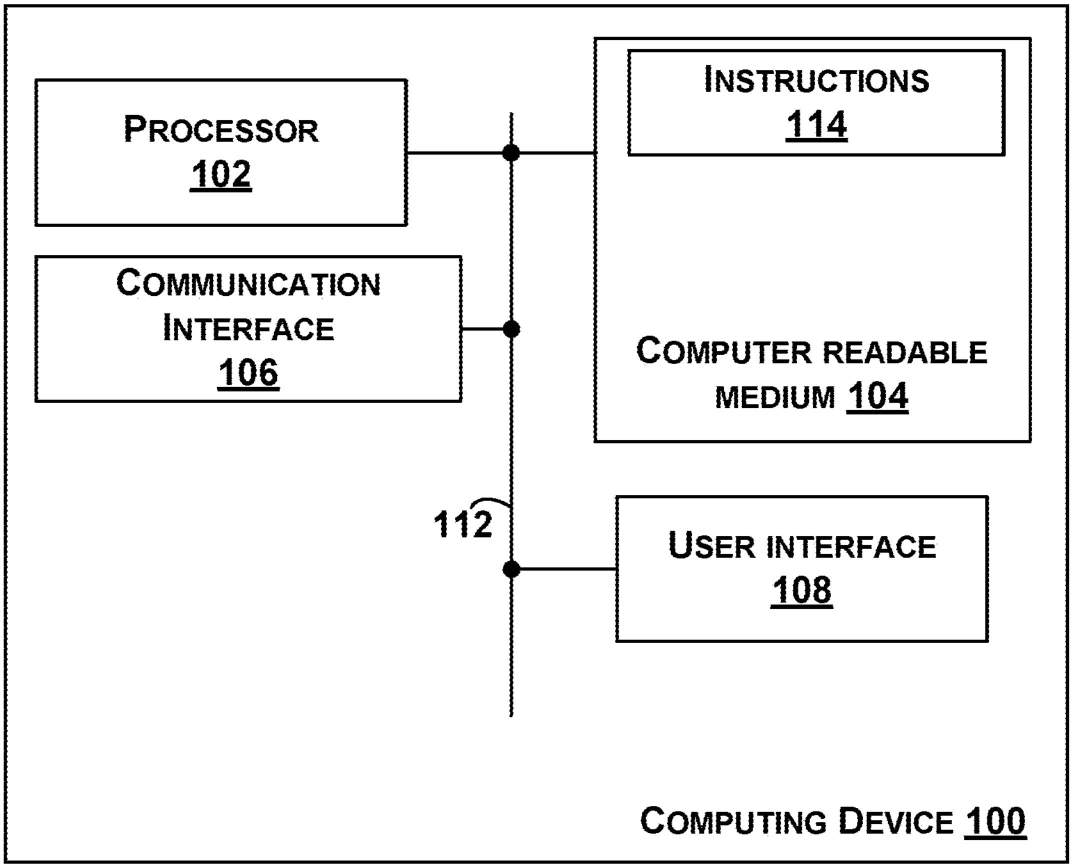
FIG. 1 is a block diagram of a computing device, according to an example.

This disclosure includes examples of aerial vehicles and wearable devices that use a compact sensor suite that includes an accelerometer and a camera for navigation purposes. For example, an aerial vehicle includes an accelerometer, a camera, an actuator (e.g., one or more flapping wings), one or more processors, and a computer readable medium storing instructions that, when executed by the one or more processors, cause the aerial vehicle to perform functions. The functions include detecting an acceleration of the aerial vehicle with the accelerometer, capturing a first image of an environment of the aerial vehicle at a first time, and capturing a second image of the environment at a second time that is after the first time. The functions also include determining a state of the aerial vehicle based on the acceleration and one or more of the first image or the second image. The state of the aerial vehicle includes one or more components that include an orientation, an angular velocity, a position, or a translational velocity of the aerial vehicle. The functions also include performing an action based on the state of the aerial vehicle.

Additionally, the functions can include providing a control signal to the actuator. In this context, determining the state of the aerial vehicle can include determining the state additionally based on the control signal and a predictive model of the aerial vehicle. For example, the one or more processors determine the state of the aerial vehicle based on a state that is expected based on the control signal provided to the actuator and a previous state of the aerial vehicle, the acceleration detected by the accelerometer, and the movement of the aerial vehicle indicated by the difference between the first image and the subsequently capture second image. Considering the state expected based on control signal input and the states indicated by the accelerometer and the camera can help mitigate unexpected readings introduced by wind variation and by sensor noise. Typically, the control signal provided to the actuator is adjusted based on a difference between a target (e.g., desired) state of the aerial vehicle and the state of the aerial vehicle determined based on the acceleration and one or more of the first image or the second image.

Another example is a wearable device that includes an accelerometer, a camera, a gyroscope, a laser rangefinder, one or more processors, and a computer readable medium storing instructions that, when executed by the one or more processors, cause the wearable device to perform functions. The functions include detecting an acceleration of the wearable device with the accelerometer, capturing a first image of an environment of the wearable device at a first time, capturing a second image of the environment at a second time that is after the first time, detecting the angular velocities of the wearable device with the gyroscope, and measuring the straight-line distance between the device and a surface with the rangefinder. The functions also include determining a state of the wearable device based on the acceleration, one or more of the first image or the second image, the angular velocity, and the straight-line distance between the device and a surface. The state of the wearable device includes one or more components that include an orientation, an angular velocity, a position, or a translational velocity of the wearable device. The functions also include performing an action based on the state of the wearable device, such as displaying information indicating the state of the wearable device. In this example, the state of the wearable device indicated by the camera is compared to the state indicated by the accelerometer to more accurately determine a true state of the wearable device.

FIG. 1 is a block diagram of a computing device 100. The computing device 100 includes one or more processors 102, a non-transitory computer readable medium 104, a communication interface 106, and a user interface 108. Components of the computing device 100 are linked together by a system bus, network, or other connection mechanism 112.

The one or more processors 102 can be any type of processor(s), such as a microprocessor, a field programmable gate array, a digital signal processor, a multicore processor, etc., coupled to the non-transitory computer readable medium 104.

The non-transitory computer readable medium 104 can be any type of memory, such as volatile memory like random access memory (RAM), dynamic random access memory (DRAM), static random access memory (SRAM), or non-volatile memory like read-only memory (ROM), flash memory, magnetic or optical disks, or compact-disc read-only memory (CD-ROM), among other devices used to store data or programs on a temporary or permanent basis.

Additionally, the non-transitory computer readable medium 104 can store instructions 114. The instructions 114 are executable by the one or more processors 102 to cause the computing device 100 to perform any of the functions or methods described herein.

The communication interface 106 can include hardware to enable communication within the computing device 100 and/or between the computing device 100 and one or more other devices. The hardware can include any type of input and/or output interfaces, a universal serial bus (USB), PCI Express, transmitters, receivers, and antennas, for example. The communication interface 106 can be configured to facilitate communication with one or more other devices, in accordance with one or more wired or wireless communication protocols. For example, the communication interface 106 can be configured to facilitate wireless data communication for the computing device 100 according to one or more wireless communication standards, such as one or more Institute of Electrical and Electronics Engineers (IEEE) 801.11 standards, ZigBee standards, Bluetooth standards, etc. As another example, the communication interface 106 can be configured to facilitate wired data communication with one or more other devices. The communication interface 106 can also include analog-to-digital converters (ADCs) or digital-to-analog converters (DACs) that the computing device 100 can use to control various components of the computing device 100 or external devices.

The user interface 108 can include any type of display component configured to display data. As one example, the user interface 108 can include a touchscreen display. As another example, the user interface 108 can include a flat-panel display, such as a liquid-crystal display (LCD) or a light-emitting diode (LED) display. The user interface 108 can include one or more pieces of hardware used to provide data and control signals to the computing device 100. For instance, the user interface 108 can include a mouse or a pointing device, a keyboard or a keypad, a microphone, a touchpad, or a touchscreen, among other possible types of user input devices. Generally, the user interface 108 can enable an operator to interact with a graphical user interface (GUI) provided by the computing device 100 (e.g., displayed by the user interface 108).

Figure 2:
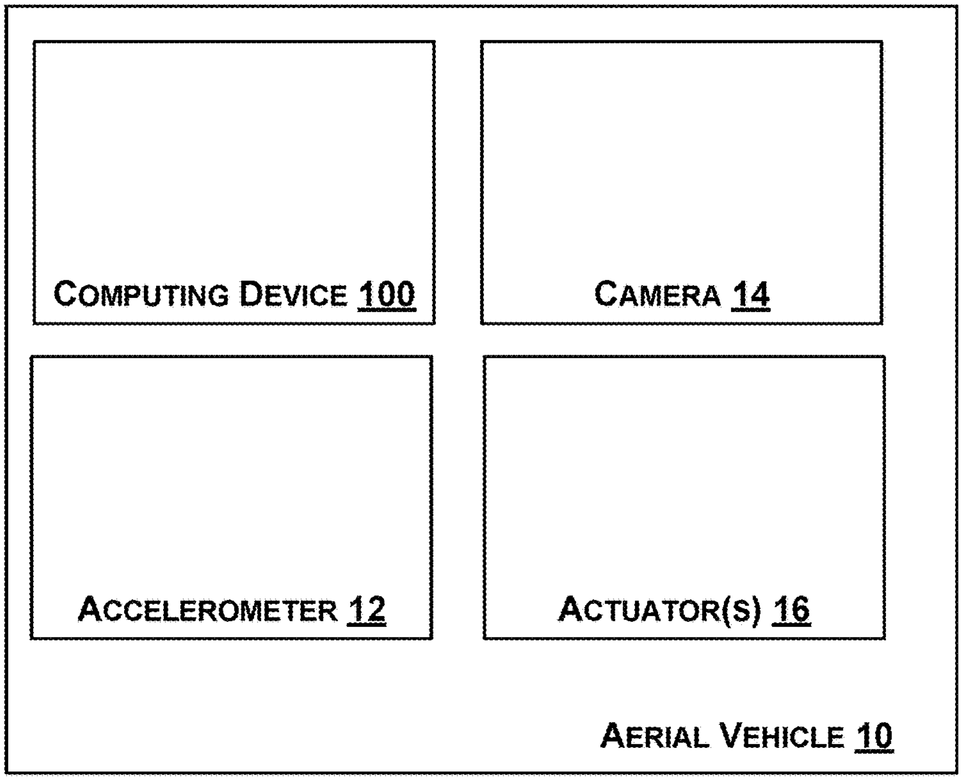
FIG. 2 is a block diagram of an aerial vehicle, according to an example.

FIG. 2 is a block diagram of an object 10 taking the form of an aerial vehicle 10. The aerial vehicle 10 includes the computing device 100, an accelerometer 12, a camera 14, and one or more actuators 16.

The accelerometer 12 can take the form of any component that measures proper acceleration of the object 10. For example, the accelerometer 12 generates a signal that indicates the acceleration of the object 10 about each of 3 axes.

The camera 14 can take the form of a digital image sensor or any other hardware configured to capture a digital image of surroundings of the object 10.

The actuators 16 generally take the form of one or more flapping wings, but could also take the form of rotors, propellers, or thrusters etc.

Figure 3:
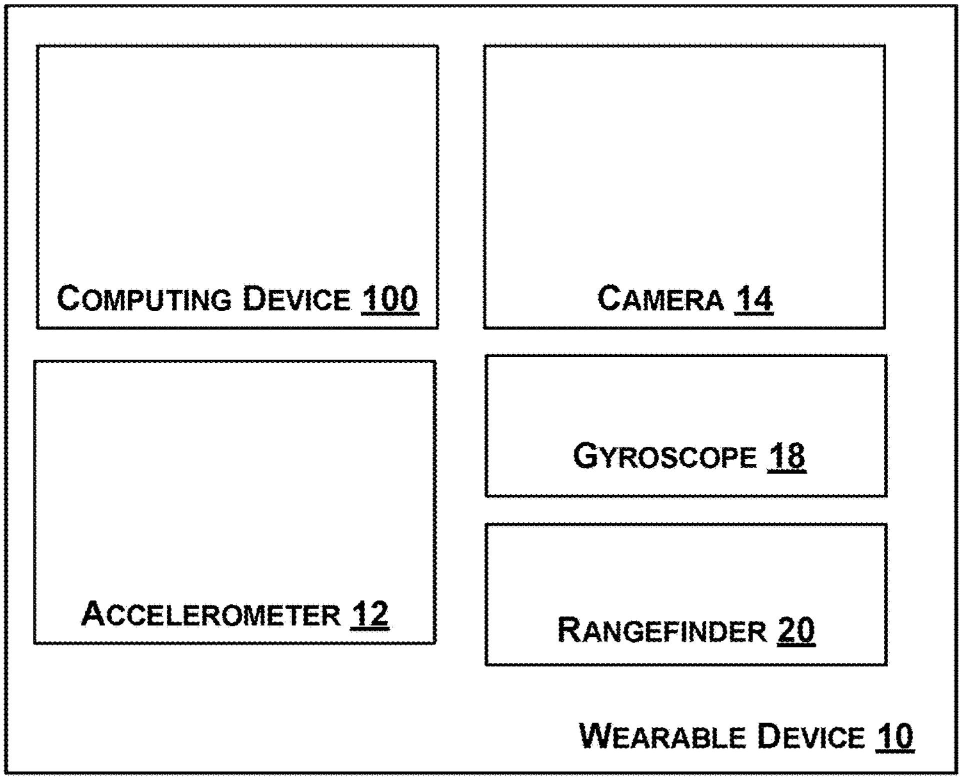
FIG. 3 is a block diagram of a wearable device, according to an example.

FIG. 3 is a block diagram of an object 10 taking the form of a wearable device 10. The wearable device 10 includes the computing device 100, the accelerometer 12, the camera 14, a gyroscope 18, and a rangefinder 20.

The gyroscope 18 typically includes a frame, a gimbal, and a rotor, but can take the form of any component that generates signals indicating proper angular velocities of the object 10.

The rangefinder 20 can take the form of any component that measures a straight-line distance between the object 10 and a surface the rangefinder is oriented towards. For example, the rangefinder 20 can include a laser and a photodetector configured to generate a signal indicating a time of flight of the laser beam as it travels from the rangefinder 20, to the surface, and back to the rangefinder 20.

FIGS. 4-7 are schematic diagrams of the aerial vehicle 10, an environment of the aerial vehicle 10, and functionality of the aerial vehicle 10.

Figure 4:
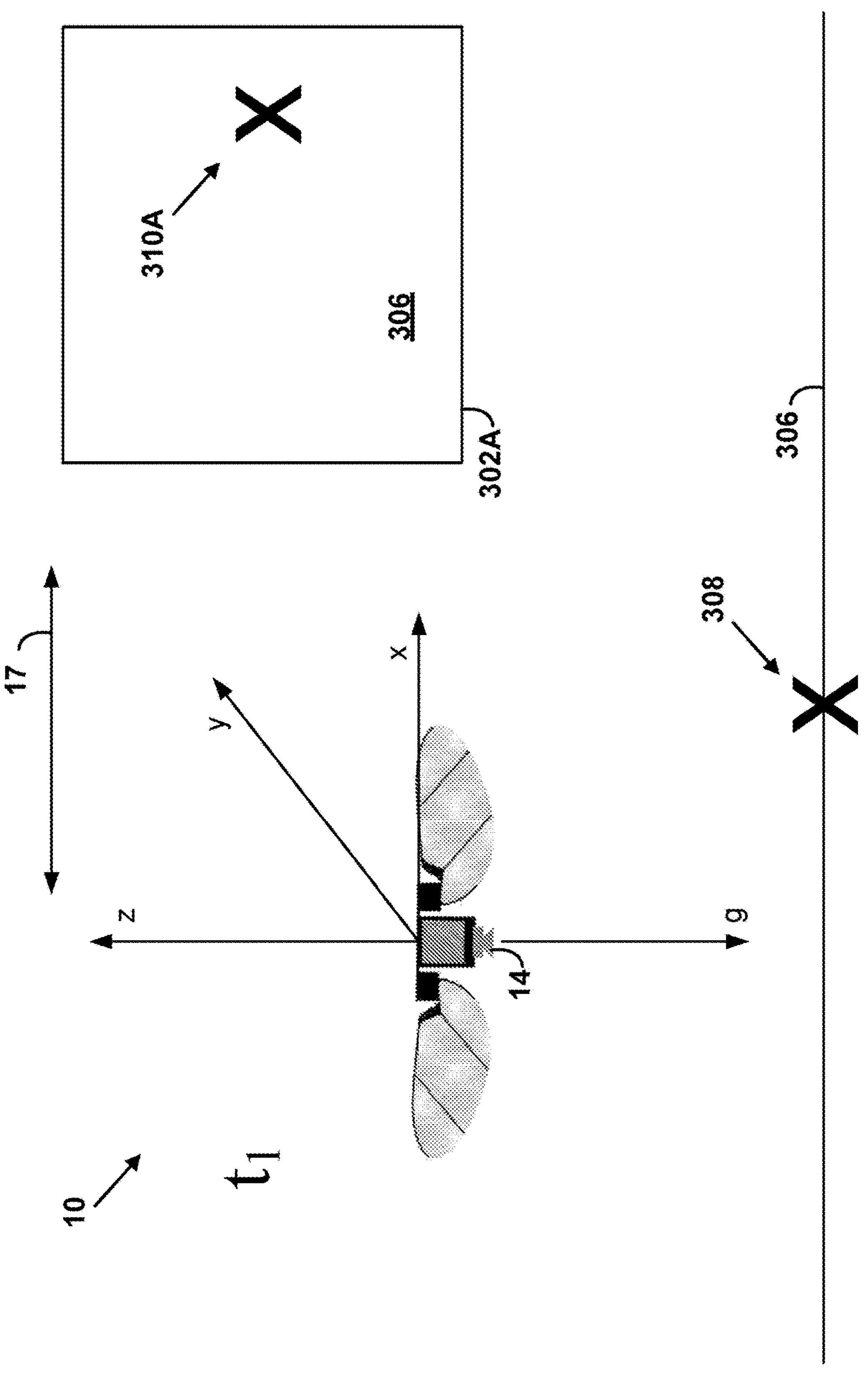
FIG. 4 is a schematic diagram of an aerial vehicle and its environment, according to an example.

FIG. 4 depicts the aerial vehicle 10 and its environment at time $t_1$. The computing device 100 uses the accelerometer 12 to detect an acceleration $(\ddot{x}, \ddot{y}, \ddot{z})$ of the aerial vehicle 10 along an x-axis, a y-axis, and/or a z-axis. The acceleration $(\ddot{x}, \ddot{y}, \ddot{z})$ can result from thrust provided by the actuators 16 and/or a wind 17 present within the environment.

The computing device 100 also uses the camera 14 to capture an image 302A of the environment of the aerial vehicle 10 at the time $t_1$. As shown, the image 302A depicts a ground surface 306 and a feature 308 (e.g., a stone on the ground surface 306) of the environment at a position 310A that corresponds to a right side of the image 302A. This is because the feature 308 is in a right portion of the field of view of the camera 14 at the time $t_1$. As shown, the camera 14 is generally attached to the aerial vehicle 10 such that the camera 14 has a downward-looking field of view that includes a ground surface 306.

Figure 5:
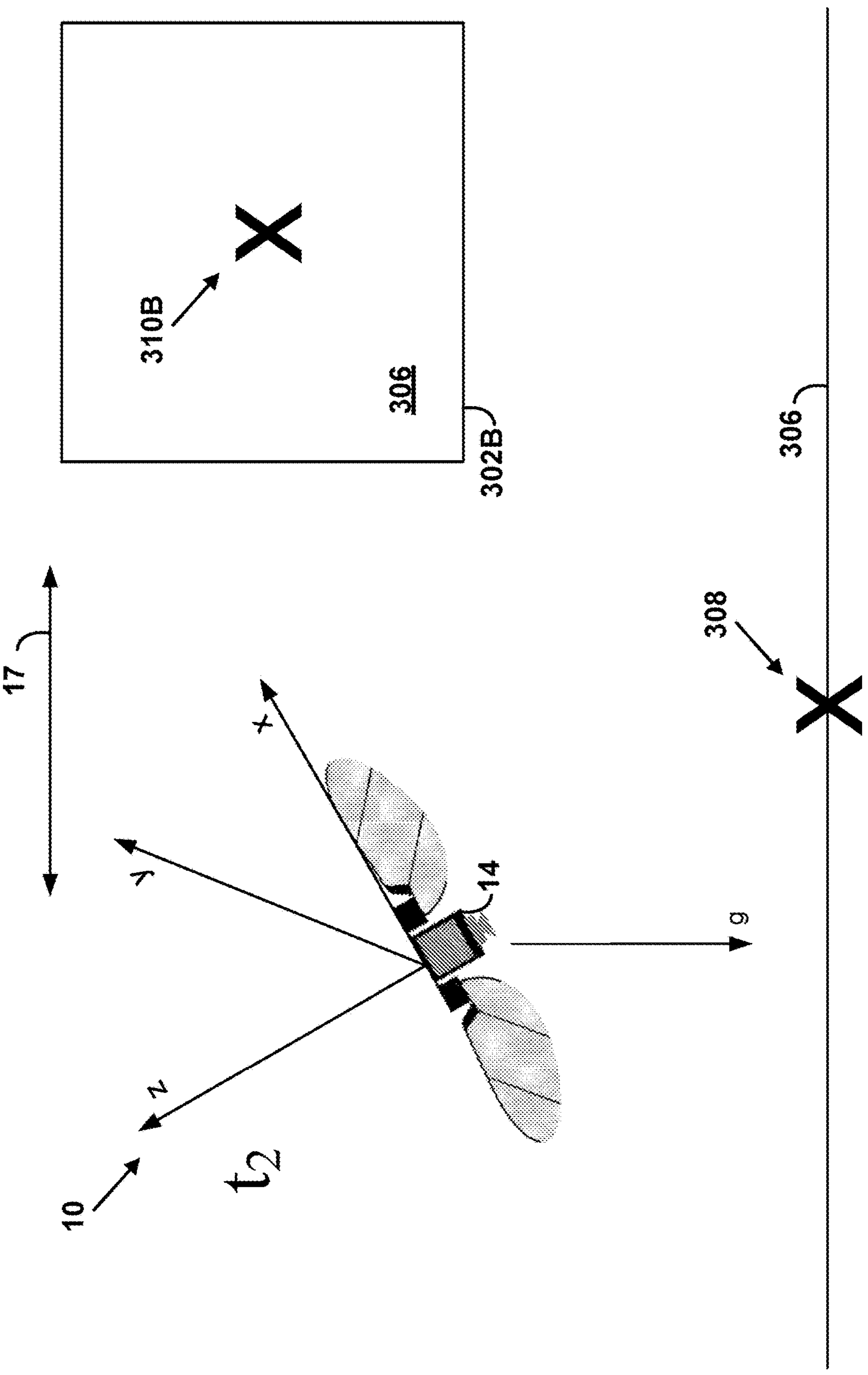
FIG. 5 is a schematic diagram of an aerial vehicle and its environment, according to an example.

Referring to FIG. 5, the computing device 100 uses the camera 14 to capture an image 302B of the environment of the aerial vehicle 10 at a time $t_2$ subsequent to time $t_1$. As shown, the image 302B depicts the ground surface 306 and the feature 308 of the environment at a position 310B that corresponds to a center of the image 302B. This because the feature 308 is in a center portion of the field of view of the camera 14 at the time $t_2$, based on the changed orientation of the aerial vehicle 10 when compared to FIG. 4.

Figure 6:
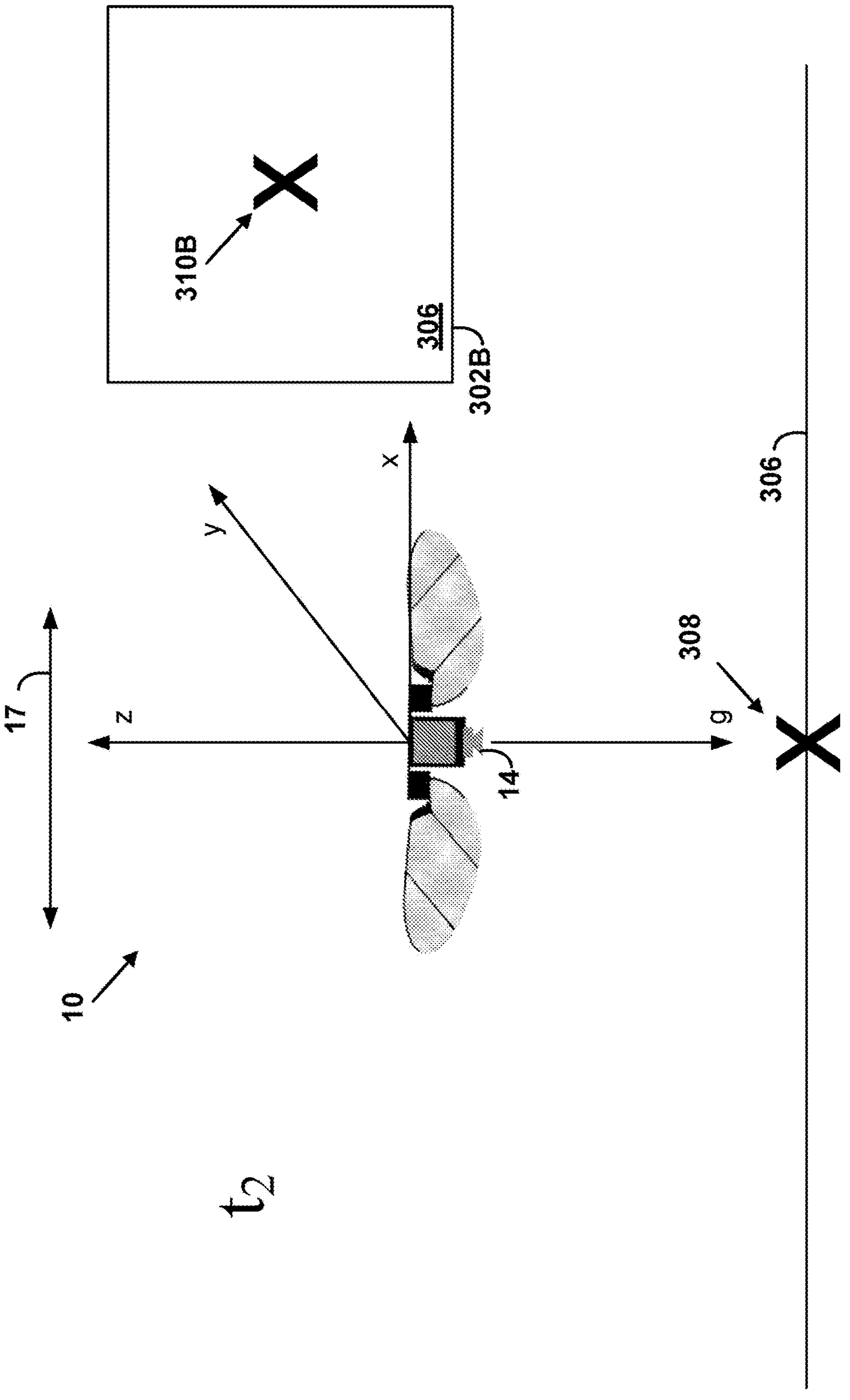
FIG. 6 is a schematic diagram of an aerial vehicle and its environment, according to an example.

In another example depicted in FIG. 6, the computing device 100 uses the camera 14 to capture an image 302B of the environment of the aerial vehicle 10 at a time $t_2$ subsequent to time $t_1$. As shown, the image 302B depicts the ground surface 306 and the feature 308 of the environment at a position 310B that corresponds to a center of the image 302B. This because the feature 308 is in a center portion of the field of view of the camera 14 at the time $t_2$, based on the changed position of the aerial vehicle 10 when compared to FIG. 4.

Figure 7:
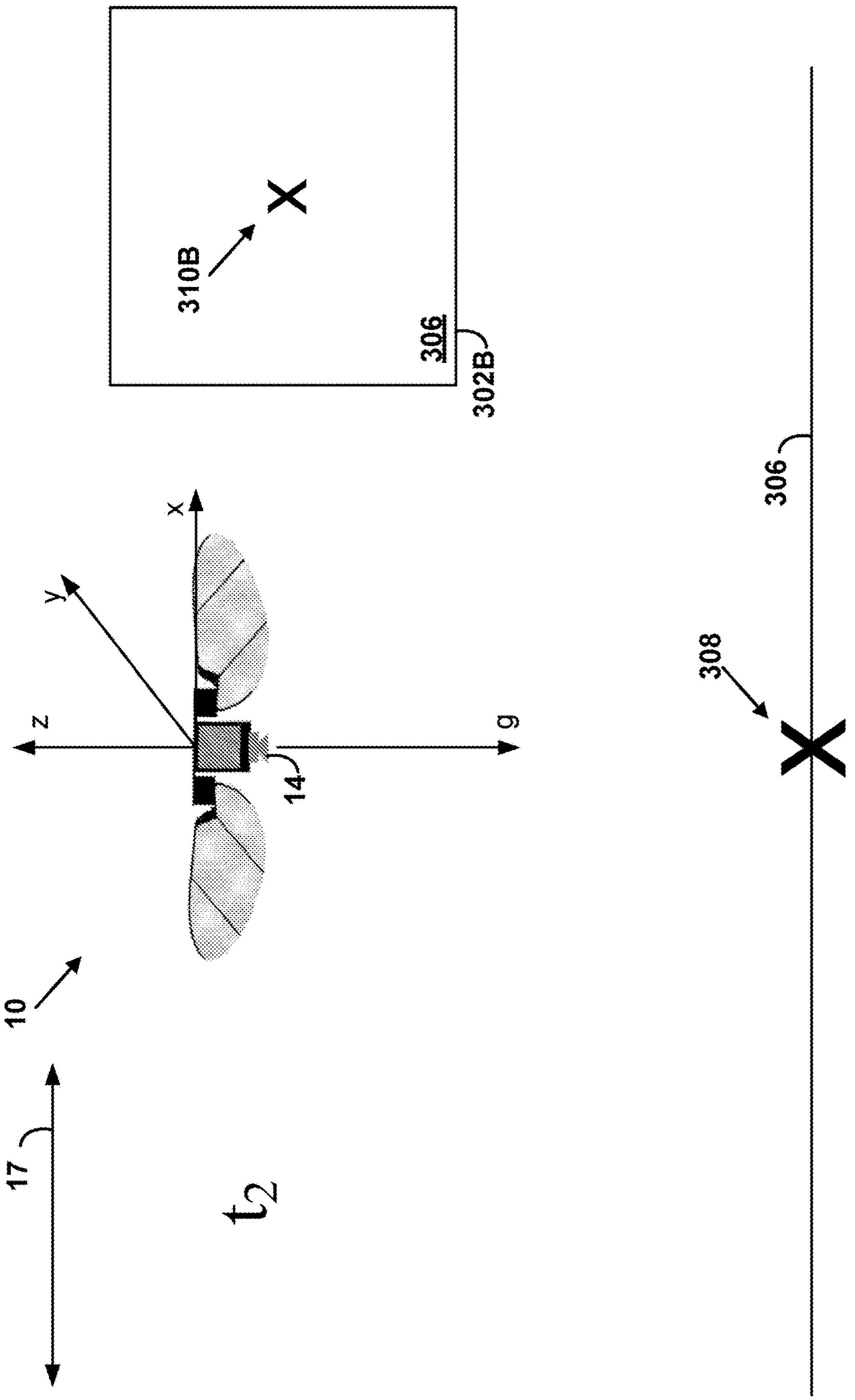
FIG. 7 is a schematic diagram of an aerial vehicle and its environment, according to an example.

In another example depicted in FIG. 7, the computing device 100 uses the camera 14 to capture an image 302B of the environment of the aerial vehicle 10 at a time $t_2$ subsequent to time $t_1$. As shown, the image 302B depicts the ground surface 306 and the feature 308 of the environment at a position 310B that corresponds to a center of the image 302B. However, the size of the feature 308 in the image 302B is smaller than the size of the feature 308 in the image 302A. This is because aerial vehicle has an increased altitude when compared to FIG. 4.

Figure 8:
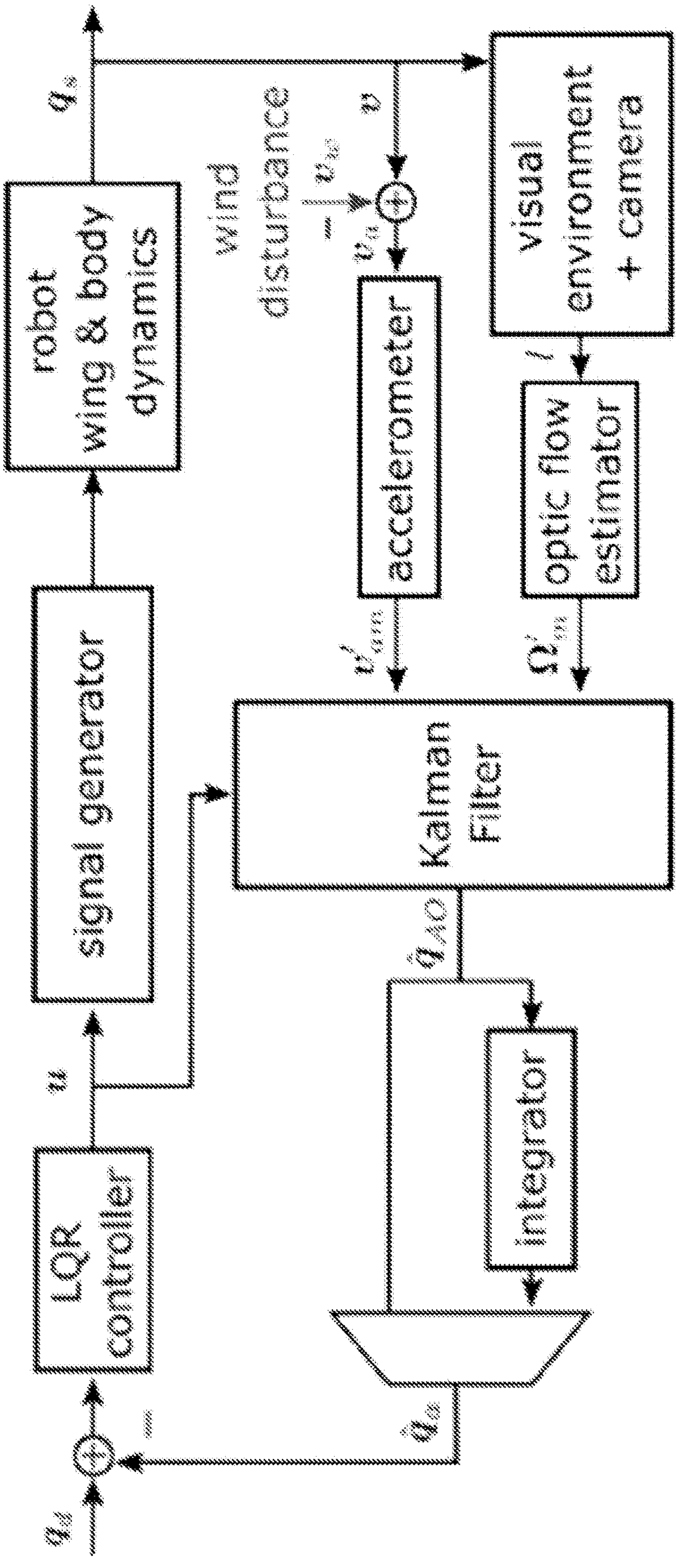
FIG. 8 is a flow diagram of functionality of an aerial vehicle, according to an example.

Referring to FIG. 8, the computing device 100 determines a state $\hat{q}$ of the aerial vehicle 10 based on the acceleration $(\ddot{x}, \ddot{y}, \ddot{z})$ detected by the accelerometer 12 and one or more of the image 302A or the image 302B. In FIG. 8, the acceleration indicated by the accelerometer is also represented as $v'_{am}$ and the image 302A and the image 302B are represented by l. The state $\hat{q}$ of the aerial vehicle 10 includes one or more of the following components: an orientation, an angular velocity, a position, or a translational velocity of the aerial vehicle. The orientation can be defined by the degree to which the aerial vehicle 10 is rotated with respect to each of three orthogonal axes of a ground-based coordinate system. The angular velocity is the first time derivative of the orientation. The position of the aerial vehicle 10 is defined with respect to the ground-based coordinate system and the translational velocity is the first time derivative of the position of the aerial vehicle 10.

In some examples, the computing device 100 calculates, for each component of the state $\hat{q}$ of the aerial vehicle 10, a weighted average of the component indicated by the accelerometer and the component indicated by the image 302A and/or the image 302B. A Kalman filter can be used to calculate the weighted average and determine the relative weights of the component indicated by the accelerometer and the component indicated by the image 302A and/or the image 302B based on the expected variance of the data generated by the accelerometer 12 and the data generated by the camera 14.

Referring to FIGS. 4-7, the computing device 100 can determine the orientation indicated by the accelerometer 12 at least in part by using the accelerometer 12 to determine the direction of the gravitational force g with respect to the aerial vehicle 10. The computing device 100 can determine the orientation of the aerial vehicle 10 indicated by the image 302A and the image 302B at least in part by determining a difference between the position 310A and the position 310B.

The computing device 100 can calculate the angular velocity indicated by the accelerometer 12 at least in part by calculating the rate of change of the direction of the gravitational force g. The computing device 100 can determine the angular velocity of the aerial vehicle 10 indicated by the image 302A and the image 302B by dividing the difference between the position 310A and the position 310B by a difference between the first time $t_1$ and the second time $t_2$.

Additionally or alternatively, the computing device 100 determines the angular velocity indicated by the image 302A and the image 304B at least in part by calculating a pixel-wise spatial gradient of a luminance of the image 302A or the image 302B and calculating a pixel-wise temporal luminance derivative using the image 302A and the image 302B. Furthermore, the computing device 100 multiplies the spatial gradient by the temporal luminance derivative to obtain the optical flow indicated by the image 302A and the image 304B, which can be used to infer the angular velocity of the aerial vehicle 10.

The computing device 100 can determine the position of the aerial vehicle 10 indicated by the accelerometer 12 by twice integrating the acceleration $(\ddot{x}, \ddot{y}, \ddot{z})$ of the aerial vehicle 10 with respect to time. The computing device 100 can determine the position of the aerial vehicle 10 indicated by the image 302A and the image 302B by determining the difference between the position 310A and the position 310B and a difference between a size of the feature 308 within the image 302A and a size of the feature 308 within the image 302B.

The computing device 100 can determine the translational velocity indicated by the accelerometer 12 by integrating the acceleration $(\ddot{x}, \ddot{y}, \ddot{z})$ of the aerial vehicle 10 with respect to time. The computing device 100 can determine the translational velocity of the aerial vehicle 10 indicated by the image 302A and the image 302B by determining a rate of change of the difference between the position 310A and the position 310B with respect to time and a rate of change of the difference between the size of the feature within the image 302A and the size of the feature within the image 302B with respect to time.

Additionally or alternatively, the computing device 100 can determine the translational velocity indicated by the image 302A and the image 302B by calculating a pixel-wise spatial gradient of a luminance of the image 302A or the image 302B and calculating a pixel-wise temporal luminance derivative using the image 302A and the image 302B. Furthermore, the computing device 100 multiplies the spatial gradient by the temporal luminance derivative to obtain the optical flow indicated by the image 302A and the image 304B, which can be used to infer the translational velocity of the aerial vehicle 10.

As shown in FIG. 8, the computing device 100 can provide a control signal u to the actuator 16 of the aerial vehicle 10 (e.g., via a signal generator). The amplitude, frequency, or other characteristics of the control signal u translates into different locomotive actions performed by the actuator 16. In this context, determining the state $\hat{q}$ of the aerial vehicle 10 includes determining the state $\hat{q}$ based on the control signal u and a predictive model of the aerial vehicle 10, in addition to the data collected by the accelerometer 12 and the camera 14. That is, the computing device 100 uses a predictive model based on physical laws and characteristics of the aerial vehicle 10 to determine the expected motion of the aerial vehicle 10 based on the control signal u provided to the actuator 16. The expected motion is compared by the Kalman filter to motion actually detected by the accelerometer 12 and the camera 14. In this way, unexpected non-idealities such as the wind can be accounted for in the control process. Generally, the computing device 100 adjusts (e.g., using a linear quadratic regulator) the control signal u based on the state $\hat{q}$ of the aerial vehicle such that the state $\hat{q}$ better aligns with an expected value. That is, the computing device 100 adjusts the control signal u to reduce a difference between a target/desired state $\hat{q}$ of the aerial vehicle 10 and the actual state $\hat{q}$ of the aerial vehicle 10.

Typically, a signal generator is used to generate control signals for respective flapping wings that represent wing tilt and/or wing motion. The control signals are generally designed to yield a desired kinetic state and/or position of the aerial vehicle 10. The accelerometer 12 is used to detect acceleration of the aerial vehicle 10 in up to three dimensions, resulting from the wing motion, gravity, and any wind present in the ambient environment. The sensed acceleration can be used to determine a three-dimensional airspeed of the aerial vehicle 10. Additionally, a downward facing camera or phototransistors captures images of the ambient environment as time passes. The images could include a single pixel or many pixels, and could be captured at discrete events in time or processed continuously using analog electronics. The scene changes or movement indicated in the images caused by movement of the aerial vehicle can be used to infer the windspeed within the environment in conjunction with the airspeed of the aerial vehicle using a Kalman Filter in which wind speed is included as one of the state variables it estimates. The Kalman filter does so by comparing the windspeed and the airspeed with values that might be expected based on the control signals provided to the actuators and provide a refined state of the aerial vehicle. The Kalman Filter is a constitutive part of a Linear Quadratic Gaussian (LQG) algorithm, the other part of which is a Linear Quadratic Regulator (LQR) that can be used to compare the state with the desired state of the aerial vehicle indicated by an input, and adjust the control signals to more closely achieve the desired state of the aerial vehicle. Thus, the aforementioned principles are related to closed-loop control of an aerial vehicle using an accelerometer, a camera, and a Kalman filter.

Figure 9:
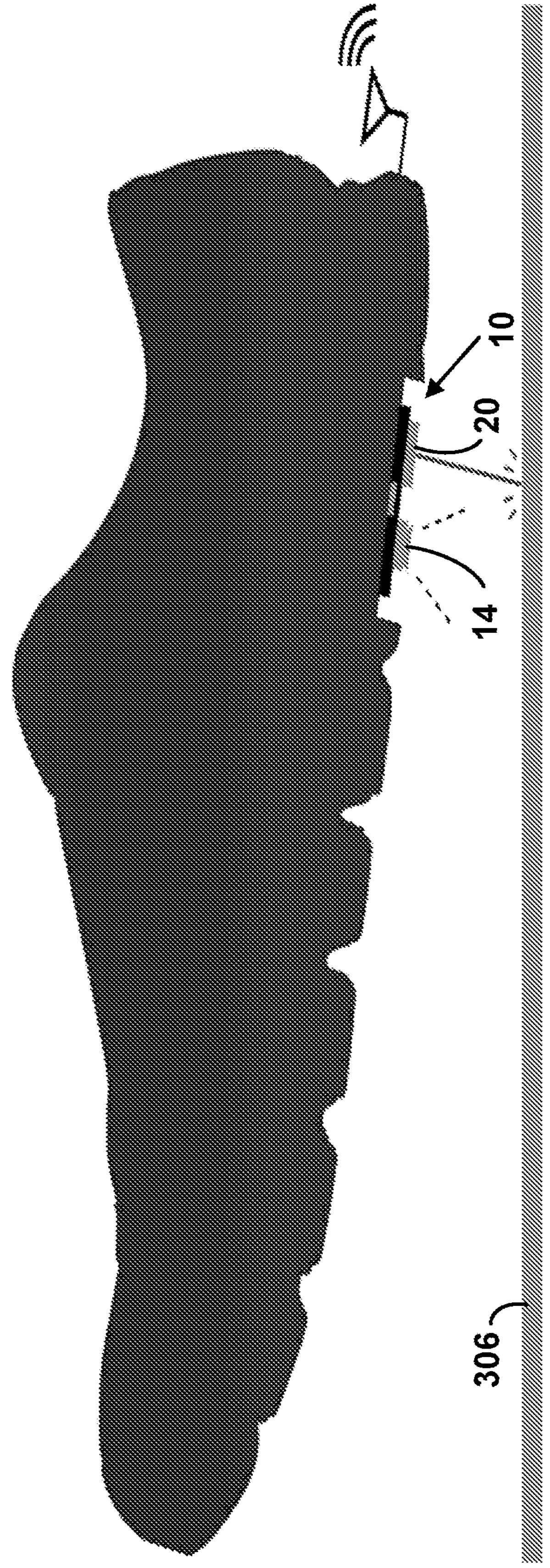
FIG. 9 is a schematic diagram of a wearable device and its environment, according to an example.

In FIG. 9, the object 10 is the wearable device 10 (e.g. a fitness tracker in the form of a shoe attachment). The wearable device 10 can perform all of the functionality of the aerial vehicle 10 described above, with the exception of the functions related to control signals. That is, the wearable device 10 is generally attached to a human user or their shoe/clothes and does not move under its own power and therefore does not analyze control signals to determine a state of the wearable device 10. In some examples, the user interface 108 of the wearable device 10 can display or audibly announce the state of the wearable device 10. Additionally or alternatively, the wearable device 10 sends the state via a wireless connection to a smart phone/watch for presentation to the user. The wearable device 10 can track the geolocation of the user, a distance ran or walked by the user, and/or an amount of energy expended by the user (e.g., based on a known weight of the user).

More particularly, the wearable device 10 can detect the angular velocity of the wearable device 10 using the gyroscope 18 and/or detect the position of the wearable device 10 using the rangefinder 20. Thus, each of the one or more components of the state of the wearable device 10 can be determined using (e.g., via a Kalman filter) a weighted average of the component indicated by the accelerometer 12, the component indicated by an image captured by the camera 14 at a first time and/or an image captured by the camera 14 at a subsequent second time, the component indicated by the rangefinder 20, and/or the component indicated by the gyroscope 18.

In some examples, the gyroscope 18 detects the angular velocity of the wearable device 10, the accelerometer 12 detects the orientation of the wearable device 10, the rangefinder 20 detects a distance between the ground surface 306 and the wearable device 10, and the image captured by the camera 14 at a first time and/or the image captured by the camera 14 at a subsequent second time is used to determine any or all of the components of the state of the wearable device 10.

Thus, the Kalman filter can be used to determine a weighted average of the angular velocity of the wearable device 10 indicated by the gyroscope 18 and the angular velocity indicated by the camera 14, a weighted average of the orientation indicated by the accelerometer 12 and the orientation indicated by the camera 14, and a weighted average of the distance between the ground surface 306 and the wearable device 10 indicated by the rangefinder 20 and the distance indicated by the camera 14.

Figure 10:
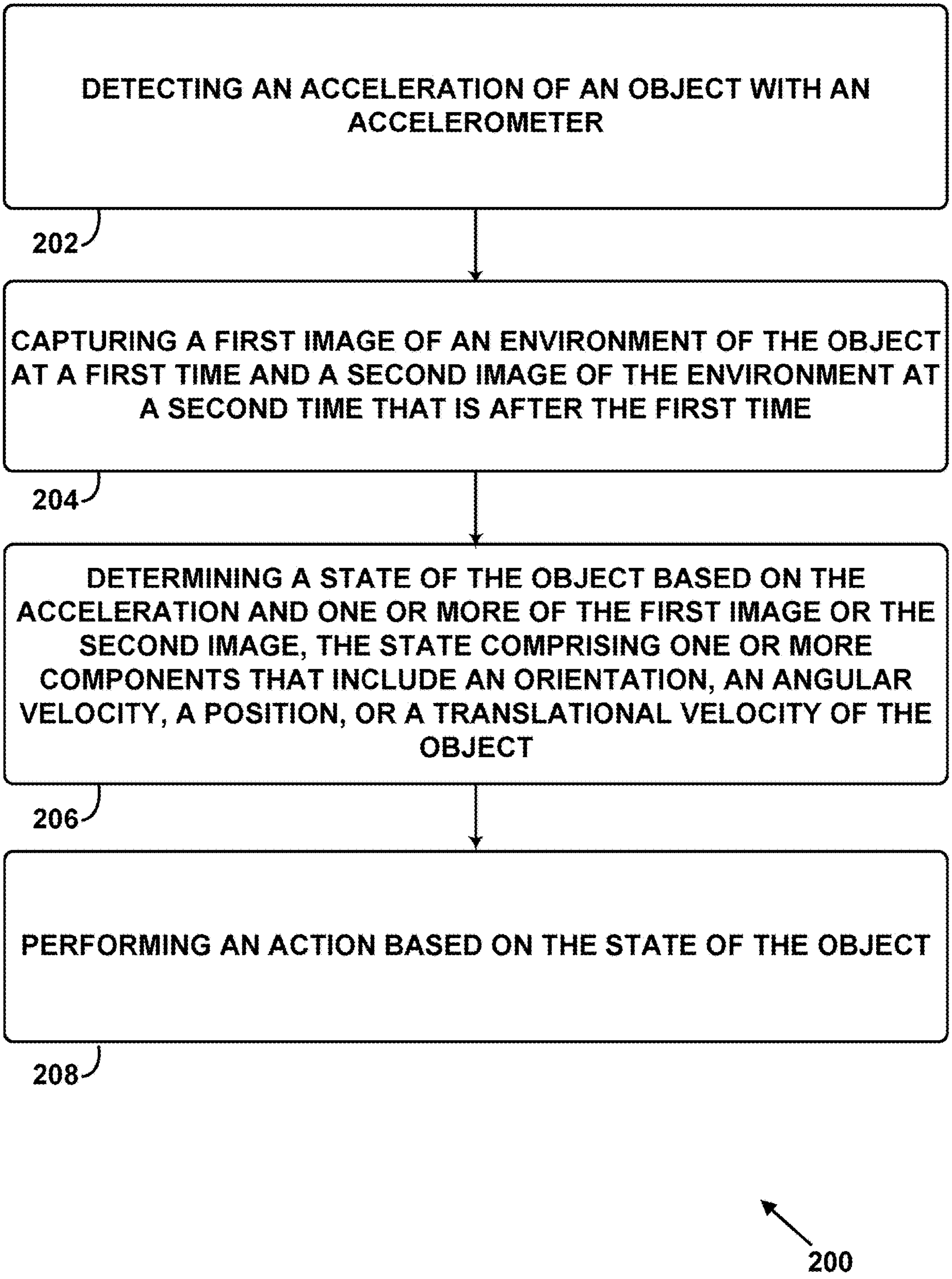
FIG. 10 is a block diagram of a method, according to an example.

FIG. 10 is a block diagram of a method 200, which in some examples is performed by the computing device 100 and/or the object 10 (i.e., the aerial vehicle 10 or the wearable device 10). As shown in FIG. 10, the method 200 includes one or more operations, functions, or actions as illustrated by blocks 202, 204, 206, and 208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 202, the method 200 includes detecting the acceleration ($\ddot{x}$, $\ddot{y}$, $\ddot{z}$) of the object 10 with the accelerometer 12. Functionality related to block 202 is described above with reference to FIGS. 4-8.

At block 204, the method 200 includes capturing the image 302A of an environment of the object 10 at a time $t_1$ and an image 302B of the environment at a second time $t_2$ that is after the time $t_1$. Functionality related to block 204 is described above with reference to FIGS. 4-8.

At block 206, the method 200 includes determining a state $\hat{q}$ of the object 10 based on the acceleration ($\ddot{x}$, $\ddot{y}$, $\ddot{z}$) and one or more of the image 302A or the image 302B. The state $\hat{q}$ includes one or more components that include an orientation, an angular velocity, a position, or a translational velocity of the object 10. Functionality related to block 206 is described above with reference to FIGS. 4-8.

At block 208, the method 200 includes performing an action based on the state $\hat{q}$ of the object 10. Functionality related to block 208 is described above with reference to FIG. 8.

While various example aspects and example embodiments have been disclosed herein, other aspects and embodiments will be apparent to those skilled in the art. The various example aspects and example embodiments disclosed herein are for purposes of illustration and are not intended to be limiting, with the true scope and spirit being indicated by the following claims.

What is claimed is:

1. A method comprising:

detecting an acceleration of an object with an accelerometer;

capturing a first image of an environment of the object at a first time and a second image of the environment at a second time that is after the first time;

detecting a position of the object using a rangefinder;

determining a state of the object based on the acceleration, one or more of the first image or the second image, and the position, the state comprising one or more components that include an orientation, an angular velocity, the position, or a translational velocity of the object, wherein determining the state comprises calculating, for each component of the one or more components, a weighted average of the component indicated by the accelerometer, the component indicated by the first image and/or the second image, and/or the component indicated by the rangefinder; and performing an action based on the state of the object.

2. The method of claim 1, wherein determining the state comprises calculating, for each component of the one or more components, a weighted average of the component indicated by the accelerometer and the component indicated by the first image and/or the second image.

3. A method comprising:

detecting an acceleration of an object with an accelerometer;

capturing a first image of an environment of the object at a first time and a second image of the environment at a second time that is after the first time;

determining a state of the object based on the acceleration and one or more of the first image or the second image, the state comprising one or more components that include an orientation, an angular velocity, a position, or a translational velocity of the object; and performing an action based on the state of the object, wherein the one or more components comprise the angular velocity and the position, the method further comprising:

detecting the angular velocity at least in part with a gyroscope; and detecting the position at least in part with a rangefinder, wherein determining the state comprises calculating, for each component of the one or more components, a weighted average of the component indicated by the accelerometer, the component indicated by the first image and/or the second image, the component indicated by the rangefinder, and/or the component indicated by the gyroscope.

4. The method of claim 1, wherein the one or more components comprise the orientation of the object, the method further comprising determining the orientation of the object indicated by the accelerometer by determining a direction of a gravitational force.

5. The method of claim 1, wherein the one or more components comprise the angular velocity of the object, the method further comprising determining the angular velocity of the object indicated by the accelerometer by determining a rate of change of a direction of a gravitational force.

6. The method of claim 1, wherein the one or more components comprise the position of the object, the method further comprising determining the position of the object indicated by the accelerometer by twice integrating the acceleration of the object with respect to time.

7. The method of claim 1, wherein the one or more components comprise the translational velocity of the object, the method further comprising determining the translational velocity of the object indicated by the accelerometer by integrating the acceleration of the object with respect to time.

8. The method of claim 1, wherein the one or more components comprise the orientation of the object, the method further comprising determining the orientation of the object indicated by the first image and the second image by determining a difference between a first position of a feature within the first image and a second position of the feature within the second image.

9. The method of claim 8, wherein the one or more components comprise the angular velocity of the object, the method further comprising determining the angular velocity of the object indicated by the first image and the second image by dividing the difference between the first position and the second position by a second difference between the first time and the second time.

10. The method of claim 1, wherein the one or more components comprise the position of the object, the method further comprising determining the position of the object indicated by the first image and the second image by determining a first difference between a first position of a feature within the first image and a second position of the feature within the second image and a second difference between a first size of the feature within the first image and a second size of the feature within the second image.

11. The method of claim 10, wherein the one or more components comprise the translational velocity of the object, the method further comprising determining the translational velocity of the object indicated by the first image and the second image by determining a first rate of change of the first difference and a second rate of change of the second difference.

12. The method of claim 1, wherein the one or more components comprise the angular velocity, the method further comprising determining the angular velocity indicated by the first image and the second image by calculating a spatial gradient of a luminance of the first image or the second image and calculating a temporal luminance derivative using the first image and the second image.

13. The method of claim 12, wherein determining the angular velocity indicated by the first image and the second image comprises multiplying the spatial gradient by the temporal luminance derivative.

14. The method of claim 1, wherein the one or more components comprise the translational velocity, the method further comprising determining the translational velocity indicated by the first image and the second image by calculating a spatial gradient of a luminance of the first image or the second image and calculating a temporal luminance derivative using the first image and the second image.

15. The method of claim 14, wherein determining the translational velocity indicated by the first image and the second image comprises multiplying the spatial gradient by the temporal luminance derivative.

16. The method of claim 1, wherein the object comprises an aerial vehicle and capturing the first image and the second image comprises capturing images of a ground surface.

17. The method of claim 16, further comprising providing a control signal to an actuator of the aerial vehicle, wherein determining the state comprises determining the state additionally based on the control signal and a predictive model of the aerial vehicle, and wherein performing the action comprises adjusting the control signal based on the state of the aerial vehicle.

18. The method of claim 17, wherein adjusting the control signal comprises adjusting the control signal based on a difference between a target state of the aerial vehicle and the state of the aerial vehicle determined based on the acceleration and one or more of the first image or the second image.

19. A non-transitory computer readable medium storing instructions that, when executed by a computing device, cause the computing device to cause performance of the method of claim 1.

20. An aerial vehicle comprising:

an accelerometer;

a camera;

an actuator;

a rangefinder;

one or more processors; and a computer readable medium storing instructions that, when executed by the one or more processors, cause the aerial vehicle to perform functions comprising:

detecting an acceleration of an object with the accelerometer;

capturing a first image of an environment of the object at a first time and a second image of the environment at a second time that is after the first time;

detecting a position of the object using the rangefinder;

determining a state of the object based on the acceleration, one or more of the first image or the second image, and the position, the state comprising one or more components that include an orientation, an angular velocity, the position, or a translational velocity of the object, wherein determining the state comprises calculating, for each component of the one or more components, a weighted average of the component indicated by the accelerometer, the component indicated by the first image and/or the second image, and/or the component indicated by the rangefinder; and performing an action based on the state of the object.

* * * * *